USOO5813772A

United States Patent [19]
Magill et al.

[11] Patent Number: 5,813,772
[45] Date of Patent: Sep. 29, 1998

[54] GARMENT LABELING SYSTEM, EQUIPMENT AND METHOD AND ELASTOMERIC LABEL FOR USE THEREWITH

[75] Inventors: Raymond H. Magill, Warminster; George T. Sellers, Jr., Philadelphia, both of Pa.; Ralph W. Grapentine, Paramus; Wonnie Brown, Haledon, both of N.J.

[73] Assignee: Avery Dennison Corporation, Pasadena, Calif.

[21] Appl. No.: 848,577

[22] Filed: Apr. 28, 1997

Related U.S. Application Data

[62] Division of Ser. No. 482,635, Jun. 7, 1995, Pat. No. 5,658,647.

[51] Int. Cl.⁶ .............................. B65C 5/04; B65C 9/42; B41F 1/08
[52] U.S. Cl. ................ 400/120.01; 156/240; 156/583.1; 156/DIG. 21
[58] Field of Search .................... 400/120.01; 156/583.1, 156/240, 517, DIG. 1, DIG. 19, DIG. 20, DIG. 21

[56] References Cited

U.S. PATENT DOCUMENTS

| | | | |
|---|---|---|---|
| 3,114,667 | 12/1963 | Braun et al. | 156/384 |
| 3,589,966 | 6/1971 | Gardner | 156/277 |
| 3,616,086 | 10/1971 | Nooder | 156/518 |
| 4,707,211 | 11/1987 | Shibata | 156/DIG. 21 |

FOREIGN PATENT DOCUMENTS 4-197300   7/1992   Japan .

OTHER PUBLICATIONS

"New Products" article, Apparel Manufacturer, authored by Kluge et al., entitled Underwear Labeling Systems, Apr. 1990.
Product Bulletin, "Print 'N Seal Electro–Sealer," model 7112 RP, Electro–Seal Corp., 1978.

*Primary Examiner*—Edgar S. Burr
*Assistant Examiner*—Daniel J. Colilla
*Attorney, Agent, or Firm*—Synnestvedt & Lechner

[57] ABSTRACT

A demand actuated system for automatically feeding, printing, cutting and applying a garment label composed of a strip of two layer laminated thermoplastic, elastomeric, preferably, polyurethane, film includes a printer and a bonder arranged for conjoint operation. The printer prints computer controlled images, by means of a thermal ink transfer ribbon, directly onto a layer of higher melting point resin and the bonder fusion bonds the other layer, of lower melting point resin, to the garment piece substantially without distortion of the imprinted image. A special two layer thermoplastic elastomeric label film is provided for use in the system.

7 Claims, 5 Drawing Sheets

GARMENT LABELING SYSTEM, EQUIPMENT AND METHOD AND ELASTOMERIC LABEL FOR USE THEREWITH

This is a divisional of application(s) Ser. No. 08/482,635 filed on Jun. 7, 1995, now U.S. Pat. No. 5,658,647.

BACKGROUND OF THE INVENTION

The present invention relates to a demand actuated system, equipment and method for automatically feeding, printing, cutting and applying garment labels, and a novel thermoplastic elastomeric, preferably polyurethane, label material cooperating therewith.

Prior to the invention, there has not existed in the apparel market a bar-code readable, variably imprintable label capable of withstanding both home laundering and commercial laundering and dry cleaning, which could be automatically, under the control of a pre-programmed computer/controller, fusion bonded to a garment piece. The principal means of imaging and affixing of labels has been impact hot stamping to imprint the image followed by sewing. Various prior art devices are identified and discussed below.

U.S. Pat. No. 5,111,216 discloses a manually operated thermal transfer device for transferring data from a database to a strip of adhesive-backed tape by thermal transfer from a transfer ribbon associated with the print head of a computer-controlled printer. The printed portion of the tape is then manually advanced and severed, and applied to a selected substrate at another location.

U.S. Pat. No. 3,114,667 discloses a two-station garment marking machine in which a label is printed at a printing station and then applied to a garment by, for example, heat sealing at a label affixing station.

U.S. Pat. No. 3,616,086 discloses an automated label apparatus including tape feeding means, printing means, cutting means and application means, with the tape feeding means being mounted to pivot or oscillate between a printing station shown in FIG. 2 and a cutting and application station shown in FIG. 1.

U.S. Pat. No. 3,199,728 discloses a label pressing machine for applying a label comprising a facing having an underlying film of bonding material adapted to adhere to a fabric under heat and pressure.

U.S. Pat. No. 3,816,211 discloses a method of making an embroidered emblem involving bonding by the use of polyurethanes.

U.S. Pat. No. 3,589,966 discloses a method of permanently identifying textile fabrics by marking with a dye resistant ink onto a tape and then bonding a tape segment onto the garment. The tape may be prepared from a variety of materials, including polyurethanes.

U.S. Pat. No. 2,602,560 discloses apparatus for automatically removing a thermoplastic type of label from a label storage magazine, positioning it accurately centered on a designated portion of an article and affixing it thereto by the application of heat and pressure.

U.S. Pat. No. 3,129,130 discloses means for automatically removing labels from a supply thereof, applying the labels to garments and securing them by high frequency heating.

U.S. Pat. No. 4,439,257 discloses a printer for printing labels which are temporarily adhered in series to a web of backing paper. A label holder is removably attached to the printer for receiving and rolling up the printed composite label web. There is a label applier separate from the printer, which unrolls the composite web from the label holder and delaminates the labels from the backing paper web and then applies the delaminated labels to garments.

U.S. Pat. No. 5,230,765 discloses an automated labeling apparatus which can apply identifying labels directly onto a sheet of cloth prior to cutting the cloth into garment pieces.

Whatever the apparent merits or demerits of various prior art equipment respecting the performance of the basic function of applying variably printable labels to garments, presently the apparel industry is not using any of the prior art techniques for the applying, by heat sealing, and the like, of labels to garments, except, possibly, in relatively isolated instances. The apparel industry is, by and large, sewing labels into garments.

In the printing of labels according to certain of the prior art techniques, labels are conventionally presented to the print head in the form of spaced die-cut label stock adhesively attached to a carrier web. The web is fed at a controlled rate across the print head by means of a motor driven roller which serves to pinch the web of labels and a transfer foil against the print head with the print line being tangentially aligned with the roller. The label web is advanced by friction between the roller and the back surface of the web to provide a positive controlled drive of the web. The transfer foil, which travels with the web, acts as a sliding bearing surface against the smooth contact face of the print head.

Dispensing of the printed label from the web is accomplished by sharply changing the direction of travel of the web by passing the web over a sharp edge known as a peeler bar. Upon leaving the web, the label is conventionally transferred by air jet to an applicator head on which it is held by vacuum. The applicator head is then moved into engagement with the product to be labelled which typically is passing thereby on a conveyor.

Pressure sensitive adhesive is frequently used in prior art labelling, particularly with respect to the labelling of paper, or cardboard boxes, or other containers having a surface to which typical pressure sensitive adhesives successfully adhere. However, the use of pressure sensitive adhesives does not produce satisfactory results in connection with the labelling of garment pieces, because the pressure sensitive adhesives do not adhere sufficiently strongly to the garment pieces in order to perform the intended function of the labelling associated with garments. Such labelling must be capable of successfully withstanding repeated home or commercial laundering or dry cleaning. It is because of such factors that the apparel industry today is still approaching the labelling of garment pieces by, essentially, preparing separate or separable labels, which are accumulated for storage, and then retrieved, usually at another location, and sewn into the garment pieces.

SUMMARY OF THE INVENTION

The invention provides a system, equipment and method, together with a special film of thermoplastic elastomeric synthetic resin, preferably polyurethane, label material, for direct application of printed images onto the label material, followed by direct application of the label material to the garment pieces, without the use of an intermediate web, or tape, of backing material to support and transport labels from one place to another, and without the accumulation and storage of printed labels. Thus, the invention provides for direct in-line use of a printer and a bonder, under the control of a pre-programmed computer/controller, together with a special label material film composed of two layers of thermoplastic, elastomeric material, preferably polyurethane, one layer being of a higher melting point thermoplastic particularly selected and adapted to have the label information imprinted thereon, and a second layer of a different thermoplastic, of lower melting point, which is particularly selected and adapted to serve the function of fusion bonding the layer having the imprinting thereon onto the garment piece to be labeled, substantially without distortion of the printed image.

Accordingly, it is an object of the invention to provide a system to label garments with a permanently bonded plastic film material whose variably printable data, preferably barcode readable, provides the consumer care and content information, as well as the garment manufacturers' and vendors' process data information, the label being capable of enduring, repeatedly, a wide variety of commercial and home laundering conditions and processes.

It is a further object of the invention to provide a system for integrating the operations of (a) a printer, capable of running with what is sometimes referred to herein as "notchless" stock, meaning a continuous film of actual label material, without interruptions or notches therein separating or semi-separating the material into individual labels, and without the use of any supplementary or backing web, and (b) a thermal bonder unit, capable of applying the labels, as they are imprinted, by fusion bonding directly to the garment pieces to be labeled, substantially without distortion of the printed image.

Another object of the invention is the provision of a label film, preferably in roll form, consisting of two thermoplastic layers, preferably polyurethane, a high melting layer particularly well suited for carrying imprinting, and a low melting layer particularly well suited to serving as a fusion bonding agent.

The labeling system and label material of the invention can eliminate manufacturing steps which currently typically include handling, stacking, unstacking, and sewing of a label into a seam. It can also eliminate independent steps of printing, bundling and shipping to remote plants for sewing.

A substantial saving of the time required to conclude a garment labeling step is accomplished by the invention. Currently garment labeling, according to the prior art processes and using the prior art equipment, typically requires from 5 to 7 seconds to complete the labeling step. By utilization of the invention, this time can be cut to an estimated 3 seconds.

The system is responsive to two different commands from the operator. Starting from an at rest condition, for example when the system is turned on for a day's operation, the system is demand actuated, meaning that the operator presses a "jog" button to initiate, under the pre-programmed control of a computer/controller, a cycle of feeding, printing and cutting a garment label. As the preparation of a label is performed, the operator inserts a garment or garment piece onto a work platform comprising a garment piece support and depresses dual (for reasons explained hereinafter) trip switches which initiate the label application portion of the system, which in turn initiates another label feed, print and cut cycle of the label preparation portion of the system to ready the next label for the next time that the operator again depresses the dual trip switches.

The system of the invention operates with the inclusion of a thermal ink transfer ribbon, which transfer ribbon comes in roll form, as is well known by those skilled in this art.

An advantage of the system of the invention is the matter of operating the label printer under the control of a computerized controller, so that a data stream can be sent to the controller where it is stored and retrieved and applied as needed in order to supply the variably printable data necessary in order to print labels for garments of various sizes, colors, styles, material content, washing and cleaning recommendations, etc.

BRIEF DESCRIPTION OF THE DRAWINGS

These and other objects and features of the invention will be more readily understood from a consideration of the following detailed description, taken with the accompanying drawings, in which:

FIG. 6 is an illustration of a typical imprinted label according to the invention.

DETAILED DESCRIPTION OF PREFERRED EMBODIMENTS

Figure 1:
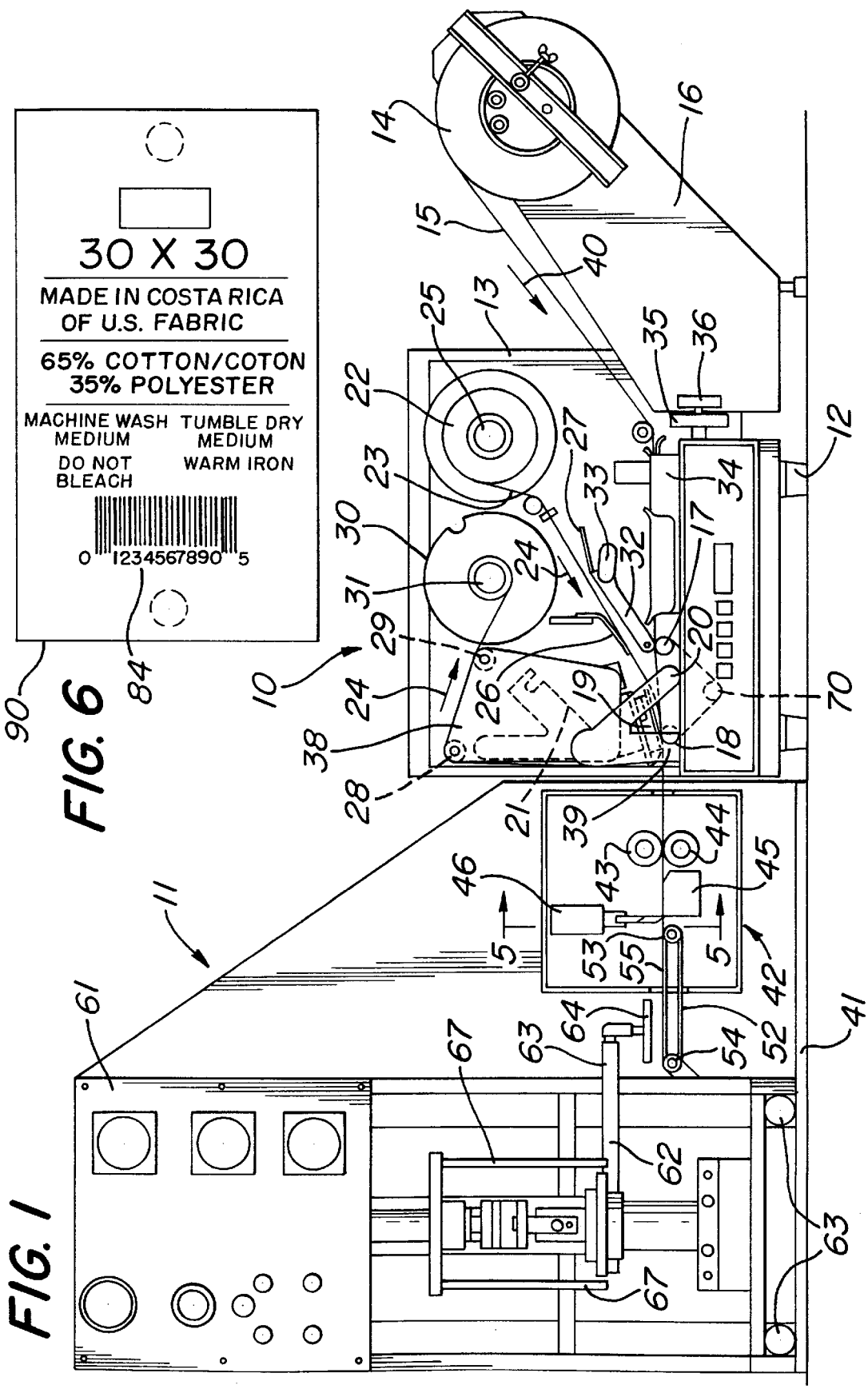
FIG. 1 is a side elevational view of the system of the invention.

Turning to FIG. 1, the system of the invention incorporates a printer 10, and a bonder 11, which are mounted together for conjoint operation.

The printer, mounted on a base 12, includes a housing 13 on which various parts are mounted. A spool 14 of label film 15 is mounted for rotation on a support arm 16 extending from the housing 13. The arrow 40 indicates the direction of travel of the label film from the supply reel 14 into the printing mechanism of the printer 10. The film passes over a rear film feed roller 17 and a platen roller 18 mounted opposite to the print head 19, after which the film travels directly into a cutting station associated with the bonder mechanism 11. The print head bell-crank lever 20 is mounted for pivotal motion between a down position shown in full lines in FIG. 1, in which the print head contacts the label film, and an up position, indicated by the dash lines 21 in FIG. 1, in which the print head is out of contact with the label film.

The imprinting on a label film is accomplished by the use of thermal ink transfer ribbon which, by the application of heat and pressure by the print head, selectively transfers thermal ink from the thermal ink ribbon directly to the label film. Thermal transfer printing requires the precisely controlled feeding of the sheet being printed with respect to the print head heater elements known as the print line. Heat and pressure at the print line effect the transfer of resin-based ink from the ink transfer foil to the label surface.

A supply spool 22 of thermal ink transfer ribbon 23, traveling in the direction indicated by the arrows 24, unreels from the spool 22 which is mounted by means of the shaft 25 onto the frame 13. The ribbon travels between an upper ribbon deflector plate 26 and a lower ribbon deflector plate 27 downwardly and in between the print head 19 and the platen roller 18, where it travels in surface to surface contact with the label film 15 for the purpose of permitting an intelligence to be imprinted on the label film by the action of the print head, under appropriate heat and pressure. The used or spent ribbon is separated from the label film as it exits from the passage between the print head 19 and the platen roller 18, and the spent ribbon then travels upwardly and over the ribbon feed roller 28, and an idler roller 29 to the ribbon take-up spool 30 mounted on the ribbon rewind shaft 31.

Web guide mechanism 34, which is adjustable by means of the web guide knob 36 and the locking knob 35 provides for precise lateral positioning of the label film 15 after it passes under the idler roller 37 on its way into contact with the print head 19 and the platen roller 18.

The outer support frame 38 provides for the mounting onto the framework 13 of the idler rollers 28 and 29, and print head lever 20, carrying the print head 18 by means of print head mounting plate 39.

Figure 7:
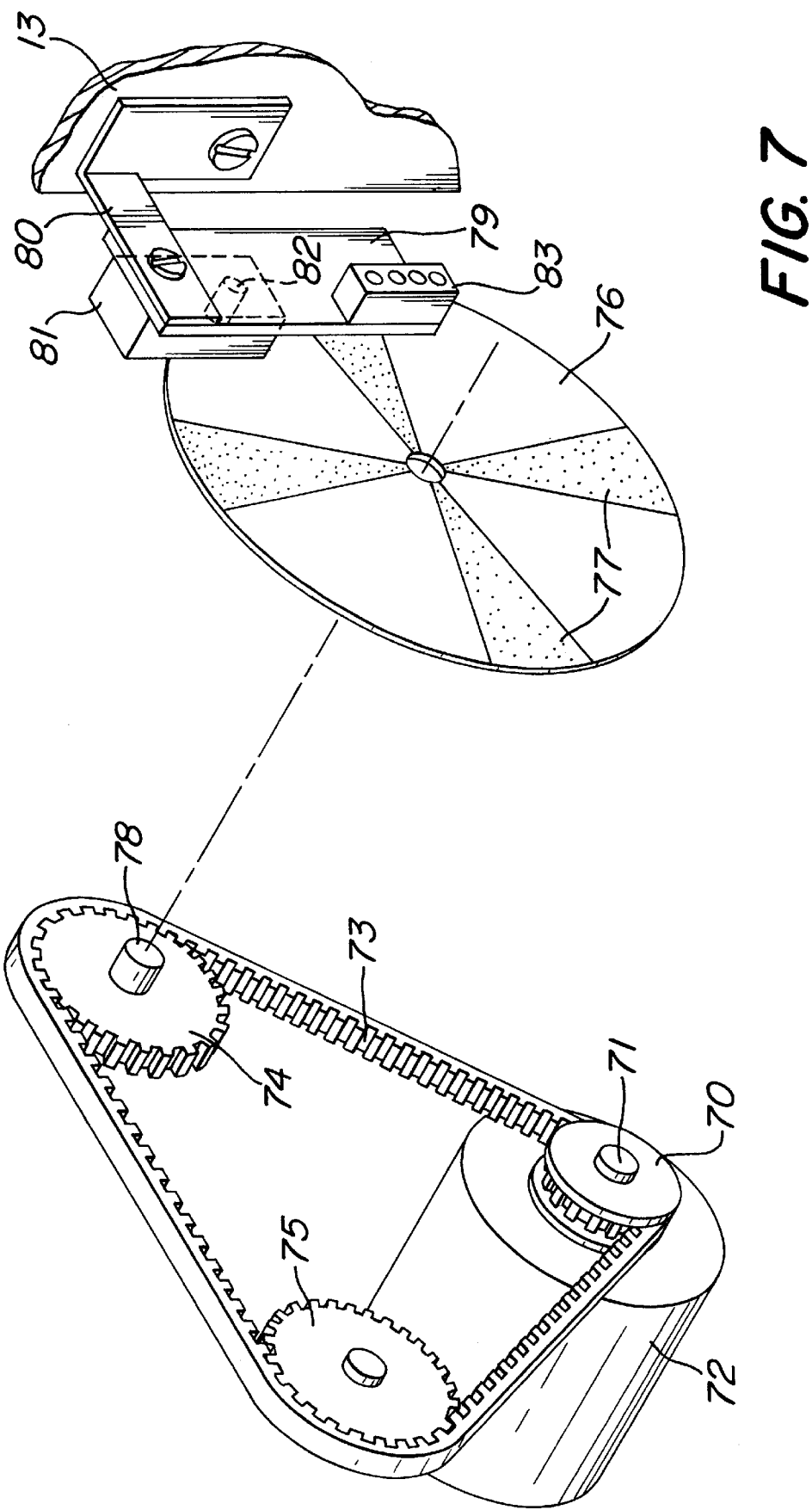
FIG. 7 is a fragmentary exploded view of the encoder disc and the sensor of the invention.

The film timing motor pulley 70, mounted on the shaft 71 of the timing motor 72 (see FIG. 7) is interconnected by the timing belt 73 with the pulleys 74 and 75, mounted respectively on the shafts of the platen roller 18 and the rear roller 17. As best seen in the exploded view of FIG. 7, the encoder disc 76, having darkened spaced segments 77 thereon, is mounted on the shaft 78 of the pulley 74, which is mounted for conjoint movement with the platen roller 18.

The printed circuit board 79 is mounted by means of bracket 80 to the frame 13 of the printer. A sensor 81 having a sensor source 82 is under the control of the printed circuit board 79, which in turn is connected by means of the electrical connections 83 with the computerized controller (not shown) for the unit. The light source 82 looks at the encoder disc. The label length is input from the pre-programmed format as part of the data stream from the computer/controller, and when the last line of the format has been printed, the pre-programmed control logic opens to look for a feed signal. The signal comes from the next darkened segment 77 on the encoder disc, which is read by the sensor light 82 and transmits a signal to stop the feed.

Directing attention to FIG. 6, the label 90 of the invention includes a number of different kinds of information, including a bar-code-readable section 84. The phrase "bar-code-readable" has special significance and meaning in the context of this specification. The use of bar codes on products is rapidly becoming more and more widespread. The bar codes are "read" by a pick-up device, associated with a computer, for multiple purposes, including inventory control, and customer check-out. The bar code must be imprinted with a special degree of precision in order to be quickly and accurately read by the reading device and, further, the printed image must not be significantly distorted during the processing of the label as it is applied to the garment piece. Thus, "bar-code-readable" as used herein means that the bar code has the requisite precision, even after processing according to the system of the invention including the fusion bonding step, to enable the bar code to be quickly and accurately read.

Figure 3:
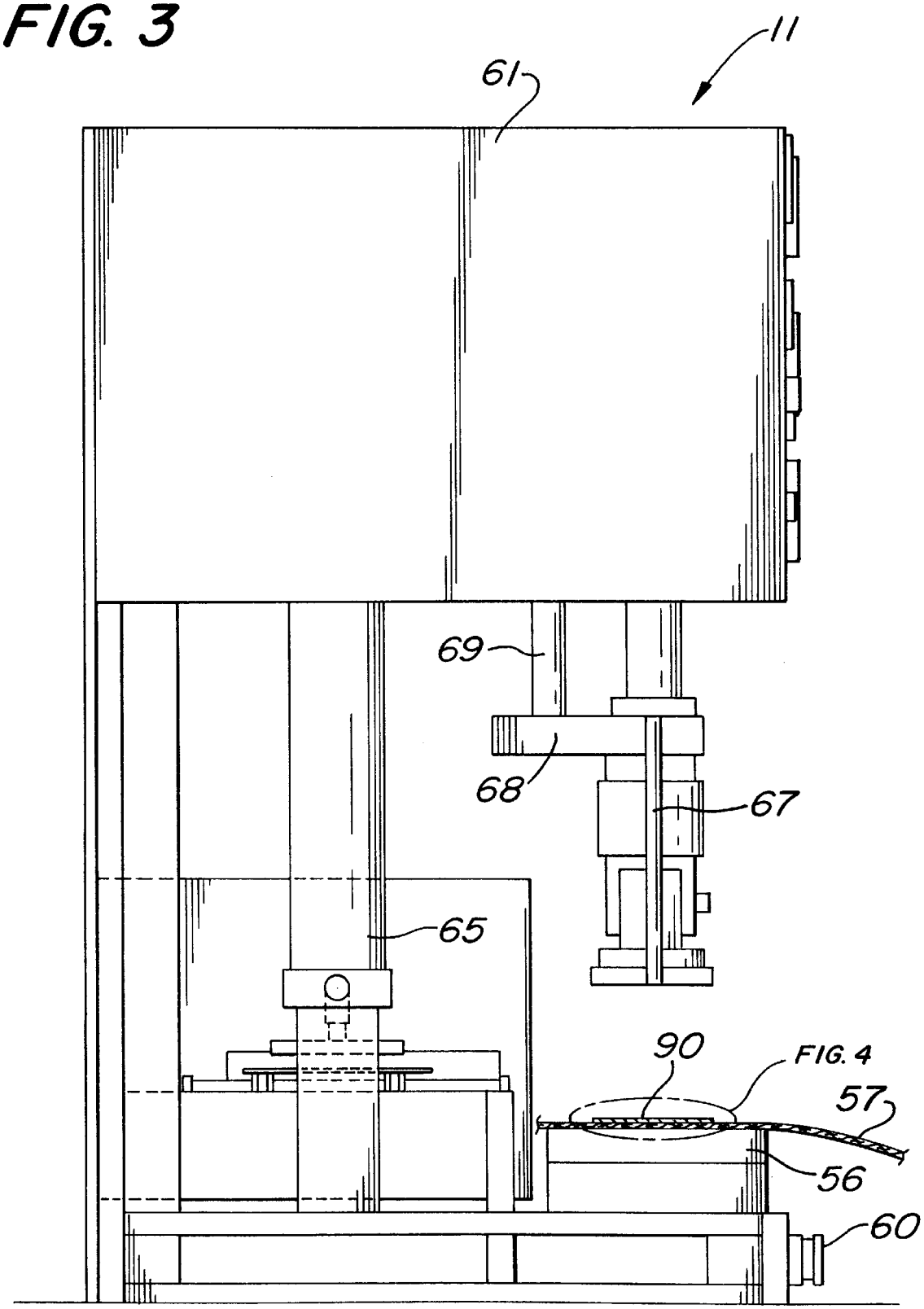
FIG. 3 is an end elevational view, of the left end of the equipment shown in FIG. 1, this view being on a larger scale than FIGS. 1 and 2.
Figure 4:
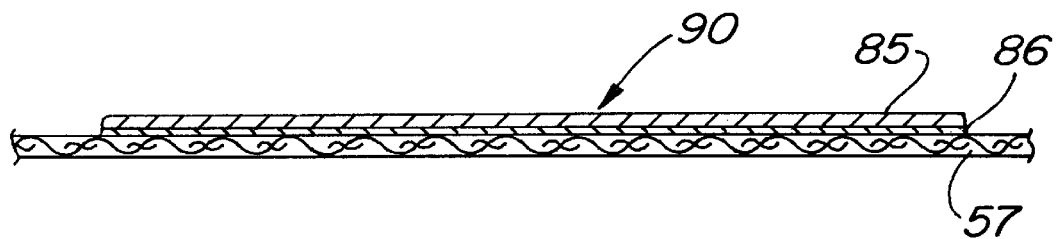
FIG. 4 is a fragmentary, enlarged sectional view of a garment label according to the invention after it is positioned on a garment piece, but before it is partially fused, the view being indicated by a dot/dash oval appearing on FIG. 3.

As seen in FIG. 4, the garment piece 57 is placed on the lower platen 56 (see FIG. 3). The label 90 consists of an upper layer 85 of relatively high melting point polyurethane, and a lower layer 86 of relatively low melting point polyurethane, the illustration of FIG. 4 being prior to the application of heat and pressure to fusion bond the label to the garment piece.

By "variably imprintable" is meant that the various different items of information on a given label can be selected to properly identify the size, style, color, etc., of the particular garment to which the label is to be applied.

An opacity enhancing additive, such as a white pigment in powder form, is preferably added to the high melting polyurethane layer in an amount sufficient to substantially and materially enhance the opacity of the label. For example, by increasing the whiteness of the background, the contrast between the background and black ink printing is increased, making the label clearer and more easily read.

The label film 15, following passage beneath the print head to receive the printed indicia thereon, emerges from the printer 10 and passes into the bonder 11.

Figure 5:
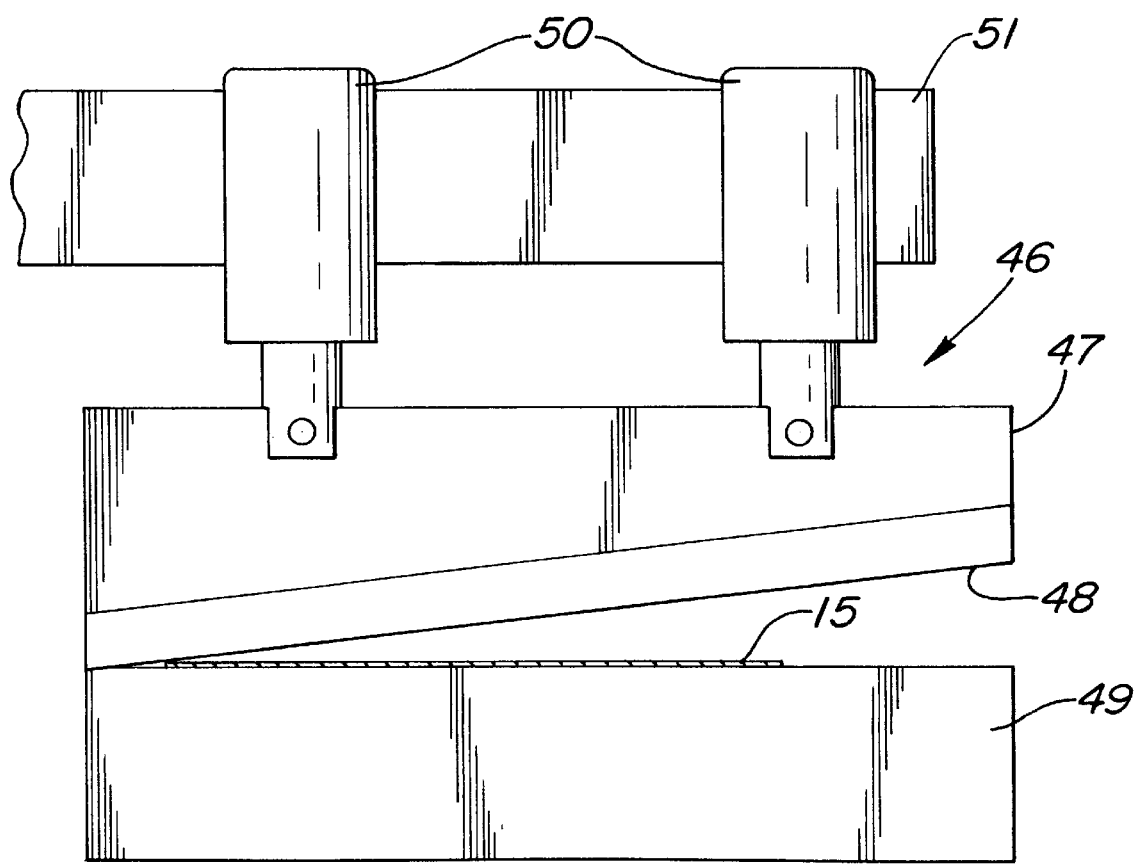
FIG. 5 is a sectional end elevation taken on the line 5—5 of FIG. 1, but on a larger scale as compared to FIG. 1, of the guillotine type cutting mechanism of the invention.

The bonder 11 includes a bonder frame 41 on which is mounted a film transport and cutting unit 42 including a pair of nip rolls 43 and 44 between which the film 15 passes. The nip rolls are driven by a stepper motor 66 coupled to the printer cycling circuit. The film passes from the nip rolls over a cutter block 45 and is cut into discrete labels 90 (FIGS. 3 and 7) by a guillotine type cutter assembly 46 (FIGS. 1 and 5). As shown in the enlarged view of FIG. 5, the cutter assembly includes a knife 47, the sharpened lower edge 48 of which is angled so as to produce a progressive shearing of the film 15 as the knife moves vertically downwardly adjacent the vertical face 49 of the cutting block 45. A pair of solenoid type actuators 50 mounted on arm 51 support the blade 47 and selectively move the blade through its cutting cycle in response to appropriately timed electrical signals.

Figure 2:
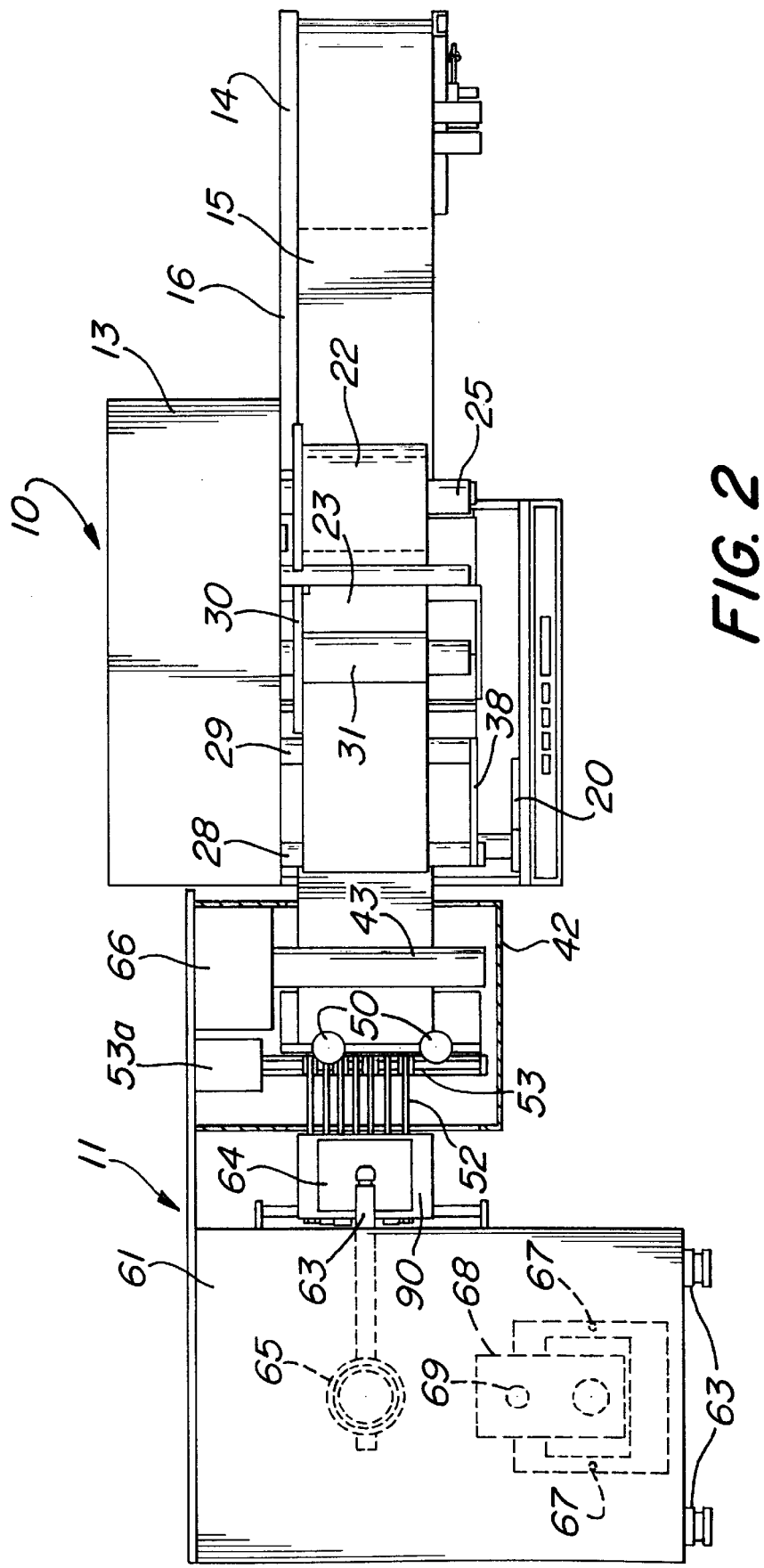
FIG. 2 is a plan view of the system shown in FIG. 1.

The severed labels 90 produced by the cutter assembly are advanced by a conveyor mechanism 52 which includes a drive roll 53 driven by a stepper motor 54 (FIG. 2) and horizontally spaced idler roll 54. A plurality of 0-rings 55 are stretched between the rolls 53 and 54 to receive and advance the cut labels 90 to a position on the conveyor mechanism from which they can be transferred selectively to a bonding station for application to the items to be labeled.

As shown most clearly in FIG. 3, the bonder 11 includes a lower platen 56 which is electrically heated to a desired controllable temperature. The fabric piece or item 57 to be labeled is positioned on the lower platen 56 and a label 90 is transferred from the conveyor 52 to the position shown in FIG. 3 by a transfer mechanism to be presently described. An electrically heated upper platen 58 is selectively reciprocatable in a vertical direction, being supported for this function by the support mechanism 59 which includes a pneumatic cylinder (not shown) at its upper end. The upper platen 58 is actuatable to move downwardly to clamp the label 90 and fabric item 57 between the upper and lower platens by the actuation of a pair of spaced control switches 60, in this instance, push-type switches, which, through appropriate electrical and pneumatic circuitry, trigger the cycling of the cylinder controlling the movement of the upper platen 58. Spaced switches 60 are employed for actuating each cycle to insure that the operator's hands are both elsewhere when the upper platen descends.

Since, as previously indicated, the bonding process is dependent on several variables, namely the temperature of the upper and lower platens, the pressure applied during the bonding period, and the time of the bonding pressure application, each of these variables is adjustable and can be controlled and monitored by means of the switches and instruments shown on the bonder control panel 61 (FIG. 1). Monitoring instruments on the panel, although not specifically shown, would typically include temperature gauges for both the upper and lower platens, as well as a pressure gauge to indicate the air pressure being delivered to the pneumatic cylinder.

When the label film is composed of the preferred polyurethanes, as disclosed herein, the temperature of the upper platen is from about 350° F. to about 450° F., with a preferred temperature being about 400° F. and the temperature of the lower platen is from about 400° F. to about 500° F., with a preferred temperature being about 450° F.

The pressure applied by the platens is from about 11 psi, corresponding to a line pressure in a pneumatic line of 1¾" diameter of about 50 lbs., to about 28 psi, corresponding to a line pressure of about 120 lbs., with a preferred pressure applied by the platens being about 18 psi, corresponding to a line pressure of about 80 lbs.

A transfer mechanism 62 is provided for transferring labels from the conveyor mechanism 52 to the lower platen 56. The transfer mechanism 62 includes a transfer arm 63 having a vacuum head 64 which is perforated and connected through a suitable conduit (not shown) to a vacuum source. The transfer arm 62 is supported for horizontal rotation through an arc of 90° on a vertical rotatable support member 65, the rotation of which is selectively controlled by a mechanism not shown. The vacuum head 64 is preferably formed from a hard plastic material to minimize the formation of static electrical charges.

Means are provided for interrupting the vacuum drawn through the vacuum head 64. With the vacuum off, the transfer arm is positioned as shown in FIG. 1 over the discharge end of the conveyor mechanism 52. When a label has advanced on the conveyor to a position beneath the vacuum head 64, the vacuum is switched on, and the label is drawn upwardly and held on the lower surface of the vacuum head. When the operator has the item to be labeled in the proper position on the lower platen 56 as shown in FIG. 3, the control switches 60 are both actuated to cycle the bonding cycle, which begins with the transfer arm 63 rotating to a position wherein the vacuum head 64 is above the lower platen 56, at which time the vacuum is interrupted and the label drops into the position shown in FIG. 3 on the item 57 to be labeled. The arm 63 then is rotated back to its starting position with the head 64 over the conveyor and, with the arm out of the way, the upper platen 58 descends, sandwiching the label and fabric item between the upper and lower platens and applying heat and pressure to the label for a predetermined time period to thermally bond the label to the fabric piece. The upper platen 58 is then retracted at the end of the predetermined period, and the labeled item is withdrawn from the lower platen and the next item is then positioned thereon to begin the next cycle.

The entire bonding cycle lasts only a few seconds with the dwell time of the upper platen 58 against the lower platen 56 typically lasting only about one second. The temperatures of the upper and lower platens are independently adjustable and it is desirable to maintain the lower platen at a slightly higher temperature than the upper platen since the adhesive layer will flow towards the higher temperature surface. The correct temperature balance for a given fabric item to be labeled must be found through trial and error since different fabrics will transfer heat at different rates.

To prevent the label item from adhering to the upper platen when the upper platen is raised, a pair of spaced pins 67 extending downwardly from bracket 68 are disposed at each side of the upper platen. The bracket 68 and pins 67 are supported on post 69 which is selectively vertically moveable independently of the upper platen movement by means not shown. When the upper platen descends and during the bonding interval, the lower ends of the pins are at the same level as the upper platen lower surface. When the upper platen ascends at the end of the bonding interval, however, the upward travel of the pins is delayed momentarily and the pins thus serve to disengage the labeled items from the upper platen should it happen to adhere thereto.

The label film is composed of two discrete layers, which are adhered to each other, one layer being specifically selected because of its ability to bear imprinting, substantially without distortion, during the processing within the system of the invention, and the other layer being specifically selected because of its superior performance as an adhesive in the fusion bonding process according to the invention. Both layers must be able to withstand repeated exposure to laundering processes, detergent and other substances used during home or commercial laundering, and, as well, to withstand repeated exposure to dry cleaning. Both layers are composed of elastomers which are thermoplastic, compatible with each other and with the garment piece to which they are to be attached, soft, pliable, exhibit good low temperature flexibility and have relatively high abrasion resistance. By "soft" is meant soft to the touch, not sharp or jagged. If a label is placed on a garment in a position in which the label comes in contact with the skin of the wearer, such as inside the collar of a shirt, a "soft" label is one which does not feel uncomfortable to the wearer, one which does not tend to prick the neck of the wearer, or cause the wearer discomfort. "Pliable" means that the label is supple, that is, it conforms readily and easily to the folds or curved configurations to which a garment is subjected by its wearer, both during use and when not in use. "Low temperature flexibility" means that the label maintains its position on the garment and continues to perform the intended function of a label, even if the wearer of the garment is exposed to severe, even extreme, cold, such as, minus 20° F. or minus 30° F.

The essential characteristics of the materials of the layers, according to the invention, are as follows.

For the under layer, or adhesive layer, the essential characteristics are washability, softness, dry cleanability, low temperature flexibility, good adhesion to fabrics, and low melt point. For the upper layer, or the layer to be imprinted, the essential characteristics are abrasion resistance, dry cleanability, washability, high melt point, low temperature flexibility, and good printability.

Both of the layers of thermoplastic resin are relatively thin, being in the range of from about 0.001 to about 0.003 inches thick. The first layer of relatively high melting point polyurethane is preferably about 0.002 inches thick, and the second, or adhesive, layer of relatively low melting point polyurethane is preferably about 0.001 inches thick.

The label film layers are preferably polyurethane, but other suitable synthetic resins such as polyester resin may be blended into, or used in place of, one of the layers, particularly the upper or imprinted layer. Adding polyester resin tends to increase the stiffness, or decrease the softness, of the resulting label, which may be a desirable result for certain applications.

Polyurethane films suitable for use with the invention can be produced as either polyester or polyether based materials, with the polyester based being preferred.

They are preferably produced in wide film form by extrusion, preferably onto a release carrier strip, of paper or the like, which temporarily supports the extrudate until it cools and becomes self-sustaining, either in two passes or in one dual extrusion pass, as will be understood by those skilled in the art of film extrusion.

For the layer to be used to receive the imprinting, it is preferred to use relatively high melting point material, that is, material having a melting point of from about 355° to 365° F. A suitable and preferred material is a polyurethane film identified as Product U-840 by Electro-Seal Corp., 55 Wanaque Avenue, Pompton Lakes, N.J. 07442. For the adhesive layer it is preferred to use a low melting point material, preferably a material having a melting point of from about 275° to about 290° F. A suitable and preferred material is polyurethane film identified as Product U-810, by the same Electro-Seal Corp., one of the joint owners of the present application. Electro-Seal Corp. sells the U-810 material and the U-840 material adhered to each other as Product LT200. Physical properties of U-840 and U-810 are given in Table 1.

TABLE 1

| Properties | U-810 Under Layer (The Adhesive Layer) | U-840 Upper Layer (The Layer to be Imprinted) |
|---|---|---|
| Melt Point | 275–290° F. | 355–365° F. |
| Melt Index (ASTM Test Method D-1238) | 45–55 gm/10 mins. | 5–15 gm/10 mins. |
| Color | Clear with slight amber tint | Clear |
| Shore Hardness A (ASTM Test Method D-1240) | 80A | 95A |
| Wash and Dry Resistance | Excellent | Excellent |
| Dry Cleaning Resistance | Excellent | Excellent |

What is claimed is:

1. Equipment for feeding, printing, cutting and applying a garment label made from a portion of a strip of thermoplastic film, said equipment comprising a label printer and a label bonder in close proximity to each other and constructed and arranged to operate conjointly, the printer having a print head and having feeding means, comprising a platen roller, for handling film strip fed thereto from a supply roll of said film strip, said printer and feeding means being controlled by a controller circuit board so as to transit through a feed, print and cut cycle upon receipt of a signal from the label bonder, and thereby imprint a pre-programmed intelligence onto a first portion of the film strip, said imprinting being accomplished with the use of a thermal ink transfer ribbon fed thereto, said print head including means for selectively applying heat and pressure to transfer the image of said intelligence from said thermal ink transfer ribbon to said first portion of the film strip, said equipment further including sensing means for sensing the transit of said first portion of the imprinted film strip, cutter means for cutting said first portion of said imprinted film strip from the balance of said film strip, said cutter means being actuated by said controller circuit board in response to a signal transmitted from said sensing means so as to effect said cutting upon receiving a signal from said sensing means indicating the completion of the transit of said first portion of imprinted film strip, the bonder including a work platform comprising garment piece support means for positioning and supporting a garment piece to which a label is to be applied, the bonder further including signal means for transmitting a signal to said controller circuit board and thence to said feeding means, the equipment further including transfer means for transferring the cut imprinted portion of said label film from said printer to said bonder in a position in which said cut portion of label film is presented to one of a pair of opposed platens, said opposed platens being relatively movable, toward and away from each other, and positioned and arranged to apply heat and pressure, for a predetermined dwell time, so as to sandwich the garment piece and the cut label portion between the opposed platens and to apply and fusion bond the cut label portion to the garment piece substantially without distortion of the imprinted image.

2. Equipment according to claim 1 in which the feeding means comprises a timing stepper motor having a first pulley mounted on the shaft thereof, a second pulley mounted on the shaft of said platen roller, and a timing belt traveling over at least said first and second pulleys, and in which the sensing means comprises an encoder disc mounted for rotation with said second pulley, said encoder disc having circumferentially spaced marks readable by the sensing means, said sensing means being sensitized by said controller circuit board so that the passing of the next spaced mark on the encoder disc will be read by the sensing means as an occasion for the transmission of a signal to the cutter means to cut said first portion of said imprinted film and to the feeding means to stop the feed of the film strip.

3. Equipment according to claim 1 in which the transfer means travels between a label pick-up position associated with the printer and a label delivery position associated with the bonder, and further including switch means operative to automatically actuate a feed, print and cut cycle upon the initiation by the transfer means of travel toward the label pick-up position.

4. Equipment according to claim 1 in which the platens consist of a lower platen comprising the garment piece support means, and an upper platen, the lower platen being heated to a temperature of from about 400° F. to about 500° F., the upper platen being heated to a temperature of from about 350° F. to about 450° F., the pressure applied by said platens during the sandwiching of the garment piece and the cut label portion being from about 11 to about 28 psi, and the predetermined dwell time being from about ½ second to about 2 seconds.

5. A demand activated system for feeding, printing, cutting and applying a garment label composed of a strip of two layer laminated thermoplastic polyurethane film, said system comprising a label printer and a label bonder in close proximity to each other and constructed and arranged to operate conjointly, the printer having a print head and having feeding means for handling notchless laminated film strip fed thereto from a supply roll of said film strip, said laminated film strip comprising a layer of relatively high melting point polyurethane faced toward said print head and a layer of relatively low melting point polyurethane faced away from said print head, said printer and feeding means being automatically controlled so as to transit through a feed, print and cut cycle, on demand, and thereby imprint a pre-programmed intelligence onto a first portion of the laminated film strip, said imprinting being accomplished with the use of a thermal ink transfer ribbon fed thereto, said print head including means for selectively applying heat and pressure to transfer the image of said intelligence from said thermal ink transfer ribbon to said first portion of the laminated film strip, said system further including sensing means for sensing the transit of said first portion of the imprinted laminated film strip, cutter means for cutting said first portion of said imprinted laminated film strip from the balance of said film strip, said cutter means being actuated by said sensing means so as to effect said cutting upon receiving a signal from said sensing means indicating the completion of the transit of said first portion of imprinted laminated film strip, the bonder further including a work platform comprising garment piece support means for positioning and supporting a garment piece to which a label is to be applied, the system further including transfer means, having a label pick-up position and a label delivery position, for transferring the cut imprinted portion of said laminated label film from said label pick-up position associated with said printer to said bonder in said label delivery position in which said cut portion of label film is presented to one of a pair of opposed platens, one of which comprises said garment piece support means, with the relatively low melting point polyurethane facing toward said garment piece support means, said opposed platens being relatively movable, on demand, toward and away from each other and positioned and arranged to apply heat and pressure so as to sandwich the garment piece and the cut label portion between the opposed platens and thus to apply and bond the cut label portion to the garment piece by fusion of the relatively low melting point polyurethane substantially without distortion of the imprinted image on the relatively high melting point polyurethane, the system further including switch means and switch triggering means associated with said transfer means and operative to automatically actuate a feed, print and cut cycle upon the initiation of the return of said transfer means to said label pick-up position.

6. A method of labeling garment pieces with labels which are bar-code-readable, variably imprintable and capable of withstanding repeated commercial and home laundering comprising, preparing a length of label film composed of two layers of thermoplastic polyurethane in composite strip form, one of said layers being composed of relatively high melting point polyurethane and the other being of relatively low melting point polyurethane, feeding the composite strip in surface to surface contact with a ribbon of thermal ink transfer medium, imprinting information on the layer of relatively high melting point polyurethane by a selective first application of heat, and first application of pressure, to the ribbon of thermal ink transfer medium, said first application of heat and pressure being maintained for a duration sufficient to effect transfer of selective portions of the thermal ink from the ribbon to the layer of relatively high melting point polyurethane but insufficient to heat either of the polyurethane layers to a temperature above its melting point, severing the imprinted portion of the composite strip, applying the severed portion to a garment piece with the relatively low melting point polyurethane facing toward the garment piece, and fusion bonding the polyurethane layers of the severed portion to the garment piece by a second application of heat, and second application of pressure, said second application of heat and pressure being for a duration sufficient to heat the relatively low melting point polyurethane layer to a temperature above its melting point but insufficient to heat the relatively high melting point polyurethane layer to a temperature at which the imprinted image will be substantially distorted.

7. A method according to claim 6 in which the second application of heat is in the range of from about 350° F. to about 500° F., the second application of pressure is from about 11 psi to about 28 psi and the second duration is from about ½ sec. to about 2 secs.

\* \* \* \* \*